(12) United States Patent
Emma (10) Patent No.: US 7,913,011 B2
(45) Date of Patent: Mar. 22, 2011

(54) METHOD AND APPARATUS FOR EMPLOYING A SECOND BUS CONTROLLER ON A DATA BUS HAVING A FIRST BUS CONTROLLER

(75) Inventor: Anthony P. Emma, Sewell, NJ (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 12/348,159

(22) Filed: Jan. 2, 2009

(65) Prior Publication Data

US 2010/0174838 A1 Jul. 8, 2010

(51) Int. Cl.
*G06F 13/00* (2006.01)
*G06F 13/36* (2006.01)

(52) U.S. Cl. ............ 710/107; 710/28; 710/45; 710/117; 710/124; 710/36; 370/352; 709/225; 713/2

(58) Field of Classification Search ............. 710/45, 710/107, 117, 124
See application file for complete search history.

(56) References Cited

U.S. PATENT DOCUMENTS

| | | | | |
|---|---|---|---|---|
| 5,781,783 | A * | 7/1998 | Gunther et al. | 713/320 |
| 6,195,768 | B1 * | 2/2001 | Green | 714/47 |
| 6,742,084 | B1 * | 5/2004 | Defouw et al. | 711/133 |
| 7,020,809 | B2 * | 3/2006 | Kleppel et al. | 714/52 |
| 7,039,734 | B2 * | 5/2006 | Sun et al. | 710/110 |
| 7,386,765 | B2 * | 6/2008 | Ellis et al. | 714/42 |
| 7,502,348 | B2 * | 3/2009 | Zhang et al. | 370/331 |
| 2003/0140150 | A1 * | 7/2003 | Kemp et al. | 709/229 |

OTHER PUBLICATIONS

Website: http://en.wikipedia.org/wiki/MIL-STD-1553; Oct. 17, 2008.

* cited by examiner

*Primary Examiner* — Brian T Misiura
(74) *Attorney, Agent, or Firm* — Law Office of Donald D. Mondul (57) ABSTRACT

A method for employing a second bus controller on a data bus having a first bus controller including: (a) recording appearances of predetermined character groups on the data bus; (b) noting patterns of the appearances preceding a qualifying quiet period on the data bus; a qualifying quiet period being a time interval having a duration greater than a predetermined duration with no traffic on the data bus; (c) employing the patterns to determine probability of occurrence of a qualifying quiet period following at least one pattern; and (d) permitting the second bus controller to control operation of the data bus during a respective qualifying quiet period when the probability of occurrence for the respective qualifying quiet period is greater than a predetermined value.

20 Claims, 5 Drawing Sheets

METHOD AND APPARATUS FOR EMPLOYING A SECOND BUS CONTROLLER ON A DATA BUS HAVING A FIRST BUS CONTROLLER

TECHNICAL FIELD

The present disclosure is directed to communication via a communication bus, and especially to communication via communication bus under control of a second bus control unit when the communication bus has a first bus control unit.

BACKGROUND

On many communication buses there is a single bus controller computer or bus control unit that is the only computer allowed to transmit and request messages from other remote terminals on the bus. By way of example and not by way of limitation, such a configuration is provided in a MIL-STD-1553 bus, such as used in certain aircraft avionics systems where a MIL-STD-1553 avionics bus is the means of communications among navigation equipment, display equipment, communications equipment and other devices.

There may be occasions where one needs to provide or coordinate information from other devices with the avionics system, but it may be desirable to avoid the complexity and expense that may be involved in providing for coordination between the first bus control unit and a second bus control unit.

There is a need for a method and apparatus for employing a second bus controller on a data bus having a first bus controller to allow a second bus controller on a data bus without requiring any direct coordination with the existing first bus controller.

There is a need for a method and apparatus for employing a second bus controller on a data bus having a first bus controller that may enable a second bus controller to observe the actions of a first bus controller, and use these observations to determine when it is safe to act on the bus without interfering with operation of the first bus controller.

SUMMARY

A method for employing a second bus controller on a data bus having a first bus controller including: (a) recording appearances of predetermined character groups on the data bus; (b) noting patterns of the appearances preceding a qualifying quiet period on the data bus; a qualifying quiet period being a time interval having a duration greater than a predetermined duration with no traffic on the data bus; (c) employing the patterns to determine probability of occurrence of a qualifying quiet period following at least one pattern; and (d) permitting the second bus controller to control operation of the data bus during a respective qualifying quiet period when the probability of occurrence for the respective qualifying quiet period is greater than a predetermined value.

An apparatus for employing a second bus controller on a data bus having a first bus controller including: (a) a recording unit for recording appearances of predetermined character groups on the data bus; (b) a noting unit for noting patterns of the appearances preceding a qualifying quiet period on the data bus; a qualifying quiet period being a time interval having a duration greater than a predetermined duration with no traffic on the data bus; (c) a probability determining unit for employing the patterns to determine probability of occurrence of a qualifying quiet period following at least one the pattern; and (d) a directing unit for permitting the second bus controller to control operation of the data bus during a respective the qualifying quiet period when the probability of occurrence for the respective qualifying quiet period is greater than a predetermined value.

It is, therefore, a feature of the present disclosure to provide a method and apparatus for employing a second bus controller on a data bus having a first bus controller to allow a second bus controller on a data bus without requiring any direct coordination with the existing first bus controller.

It is another feature of the present disclosure to provide a method and apparatus for employing a second bus controller on a data bus having a first bus controller that may enable a second bus controller to observe the actions of a first bus controller, and use these observations to determine when it is safe to act on the bus without interfering with operation of the first bus controller.

Further features of the present disclosure will be apparent from the following specification and claims when considered in connection with the accompanying drawings, in which like elements are labeled using like reference numerals in the various figures, illustrating the various embodiments of the disclosure.

DETAILED DESCRIPTION

Figure 1:
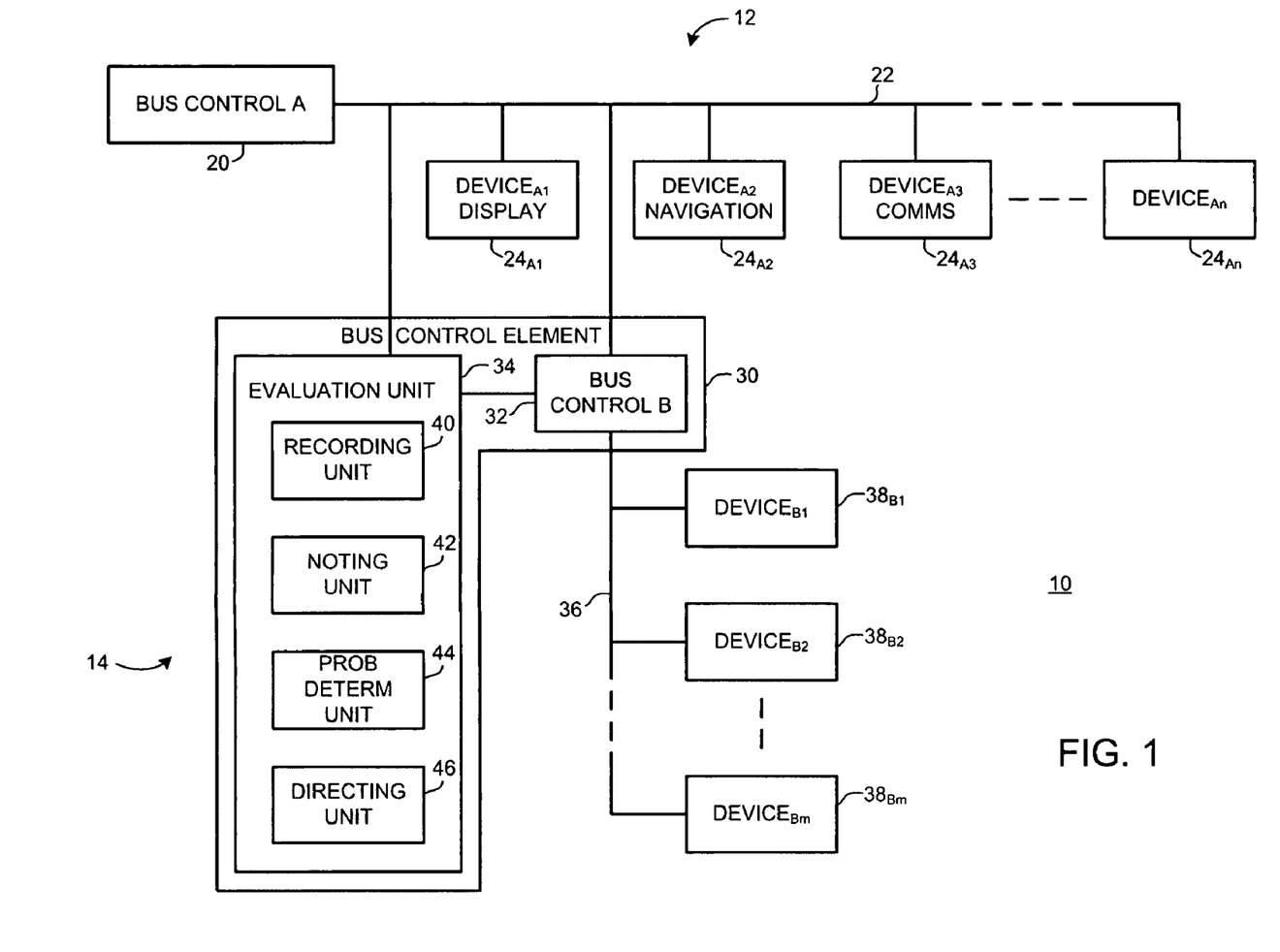
FIG. 1 is a schematic diagram of an apparatus for using the present disclosure.

FIG. 1 is a schematic diagram of an apparatus for using the present disclosure. In FIG. 1, a system 10 may include a first bus communication system 12 and a second bus communication system 14. First bus communication system 12 may include a first bus control unit A 20 coupled for controlling communication on a first data bus 22 among a plurality of devices $24_{A1}$, $24_{A2}$, $22_{A3}$, $24_{An}$. The indicator "A" is employed to signify that the respective device $24_{An}$ is responsive to first bus control unit A 20 in accessing first data bus 22. The indicator "n" is employed to signify that there can be any number of devices coupled with first data bus 22. The inclusion of four devices $24_{A1}$, $24_{A2}$, $22_{A3}$, $24_{An}$ in FIG. 1 is illustrative only and does not constitute any limitation regarding the number of devices that may be connected with first data bus 22 in the present disclosure. By way of example and not by way of limitation, device $24_{A1}$ may be embodied in a display device, device $24_{A2}$ may be embodied in a navigation device, device $24_{A3}$ may be embodied in a communication device and device $24_{An}$ may be embodied in another device.

Throughout this description, use of a reference numeral using a generic subscript herein may be taken to mean that any respective member of the plurality of elements having the same reference numeral may be regarded as included in the description. Thus, by way of example and not by way of limitation, referring to device $24_{An}$ in describing FIG. 1 may be taken to mean that any device—$24_{A1}$, $24_{A2}$, $24_{A2}$, or $24_{An}$ (FIG. 1)—may be regarded as capable of employment as described.

By way of further example and not by way of limitation, first data bus 22 may be embodied in a MIL-STD-1553 serial data bus. MIL-STD-1553 is a military standard published by the United States Department of Defense that defines the mechanical, electrical and functional characteristics of a serial data bus. It was originally designed for use with military avionics, but has also been used in spacecraft on-board data handling subsystems, both military and civil.

Second bus communication system 14 may include a bus control element 30 coupled for controlling communication on a second data bus 36 among a plurality of devices $38_{B1}$, $38_{B2}$, $38_{Bm}$. Bus control element 30 may include a second bus control unit B 32 and an evaluating unit 34. The indicator "B" is employed to signify that the respective device $38_{Bm}$ is responsive to second bus control unit B 32 in accessing second data bus 36. The indicator "m" is employed to signify that there can be any number of devices coupled with second data bus 36. The inclusion of three devices $38_{B1}$, $38_{B2}$, $38_{Bm}$ in FIG. 1 is illustrative only and does not constitute any limitation regarding the number of devices that may be connected with second data bus 36 in the present disclosure.

Each respective device $38_{Bm}$ may be coupled directly with second bus control unit B 32 rather than being coupled with second bus control unit B 32 via second data bus 36 (not shown in FIG. 1; understood by those skilled in the art of data system design). Second bus control unit B 32 may also effect additional control of communication among a devices $24_{A1}$, $24_{A2}$, $22_{A3}$, $24_{An}$ on first data bus 22.

Throughout this description, use of a reference numeral using a generic subscript herein may be taken to mean that any respective member of the plurality of elements having the same reference numeral may be regarded as included in the description. Thus, by way of example and not by way of limitation, referring to device $38_{Bm}$ in describing FIG. 1 may be taken to mean that any device—$38_{B1}$, $38_{B2}$, $38_{Bm}$ (FIG. 1)—may be regarded as capable of employment as described.

Evaluation unit 34 may include a recording unit 40, a noting unit 42, a probability determining unit 44 and a directing unit 46. Recording unit 40, noting unit 42, probability determining unit 44 and directing unit 46 may cooperate in permitting second bus control unit B 32 to control operation of first data bus 22 during quiet periods detected on first data bus 22. Recording unit 40 may record appearances of traffic including predetermined character groups on first data bus 22. Predetermined character groups may be, by way of example and not by way of limitation, command words.

Noting unit 42 may note patterns of appearances recorded by recording unit 40 that precede a qualifying quiet period on first data bus 22. A qualifying quiet period may be a time interval having a duration greater than a predetermined duration with no traffic on first data bus 22.

Probability determining unit 44 may employ patterns noted by noting unit 42 to determine probability of occurrence of a qualifying quiet period on first data bus 22 following a respective pattern.

Directing unit 46 may permit second bus control unit B 32 to control operation of first data bus 22 during a respective qualifying quiet period when probability of occurrence of the respective qualifying quiet period is greater than a predetermined value.

Recording unit 40; noting unit 42, probability determining unit 44 and directing unit 46 may be embodied in a single program in a computing apparatus (not shown in FIG. 1; understood by those skilled in the design of bus control systems). Such a single program may further be integrally embodied in a bus control unit such as, by way of example and not by way of limitation, one of first bus control unit A 20 and second bus control unit B 32. Such a single program may further be integrally distributed among a plurality of bus control units such as, by way of example and not by way of limitation, first bus control unit A 20 and second bus control unit B 32.

Evaluation unit 34 may predict occurrence of qualifying quiet periods and evaluation unit 34 and second bus control unit B 32 may cooperate to provide access to first data bus 22 by one or more respective device $38_{Bm}$ during qualifying quiet periods. Second bus control unit B 32 may be directly coupled with first data bus 22 for providing access to first data bus 22 by one or more devices $38_{Bn}$.

The method of the present disclosure may employ two data structures. A first data structure may be a queue of noted predetermined character groups, such as command words, reflecting a history of command words that have traversed a data bus under observation (e.g. first data bus 22; FIG. 1). A second data structure may be a tree relating orders of appearances of command words on the observed data bus, with information stored relating to each observed command word. By way of example and not by way of limitation, the queue may contain D entries, and the tree may have a depth D.

Figure 2:
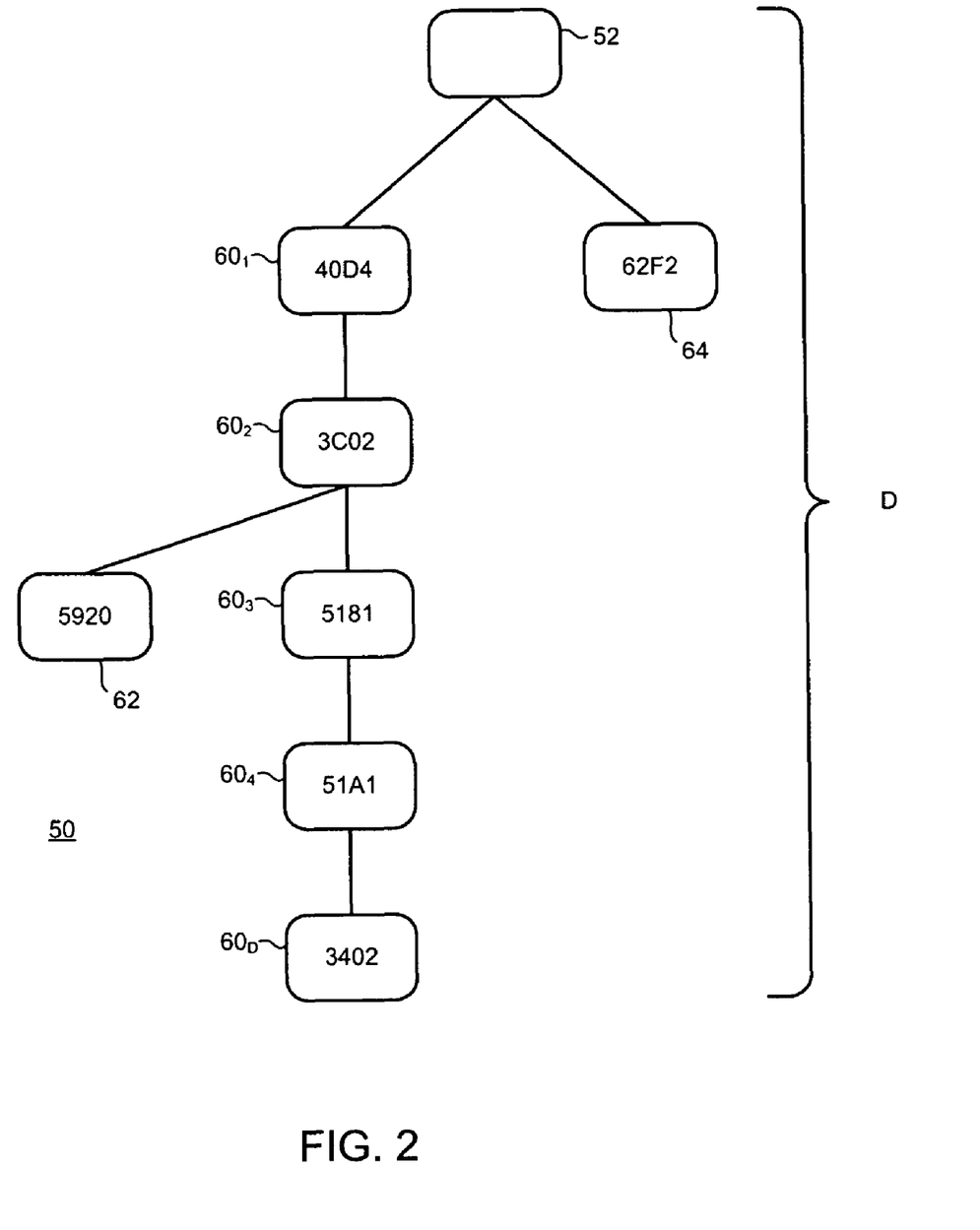
FIG. 2 is a schematic diagram of a representative tree structure useful in practicing the method of the present disclosure and operating the apparatus of the present disclosure.

FIG. 2 is a schematic diagram of a representative tree structure useful in practicing the method of the present disclosure and operating the apparatus of the present disclosure. In FIG. 2, a tree 50 may have a root node 52. Root node 52 may be an empty node. Observation nodes $60_1$, $60_2$, $60_3$, $60_4$, $60_D$ may contain data relating to command words observed on a data bus. The indicator "D" is employed to signify that there can be any depth of nodes recorded in tree 50. The inclusion of five node levels $60_1$, $60_2$, $60_3$, $60_4$, $60_D$ in FIG. 2 is illustrative only and does not constitute any limitation regarding the number of node that may be included in tree 50 in the present disclosure. By specifying a maximum "depth" D for tree 50 one may adjust how large tree 50 may be permitted to "grow". Limiting the value of depth D to a lesser value may sacrifice logging of larger or longer sequences of command words and thereby limit accuracy of determination of quiet periods. On the other hand, limiting the value of depth D to a lesser value may serve to ensure that decisions to permit a second bus controller to participate on a data bus may not be based upon "old" information reflecting how the bus was operating several minutes or several hours ago. That is, one may limit the value of D to ensure that decisions may be based upon current data rather than old data. A node 62 depends from node $60_2$ in parallel with nodes $60_3$, $60_4$, $60_D$. A node 64 depends from root node 52.

Node $60_1$ represents observing a command word 40D4. Node $60_2$ represents observing a command word 3C02. Node $60_3$ represents observing a command word 5181. Node $60_4$ represents observing a command word 51A1. Node $60_D$ represents observing a command word 3402. By way of explanatory example, presenting nodes $60_1$, $60_2$, $60_3$, $60_4$, $60_D$ as illustrated in FIG. 2 reflects that a queue of previously seen command words on a data bus would look like

40D4, 3CO3, 5181, 51A1, 3402

Command word 40D4 is entered in tree 50 in a position (node $60_1$) indicating that command work 40D4 is the most recent command word observed on the bus.

If one now observes a command word 5D1F on the bus, the time between having received command word 40D4 and command word 5D1F may be noted. If time of receiving extant command word 5D1F ($T_m$) less the time that next-previous command word 40D4 was received ($T_{m-1}$) is greater than a predetermined quiet period threshold ($QT_{th}$), then a quiet time period has just occurred. It may be desired that occurrence of a quiet time period be noted or logged. The event of occurrence of a quiet time period may be logged in the case illustrated in FIG. 2 as:

After 4D04 a quiet period occurred.
After 3CO2 then 4D04 a quiet period occurred.
After 5181 then 3CO2 then 4D04 a quiet period occurred.
After 51A1 then 5181 then 3CO2 then 4D04 a quiet period occurred.
After 3402 then 51A1 then 5181 then 3CO2 then 4D04 a quiet period occurred.

Information relating to occurrence of a quiet period following observation of command word 40D4 on the bus may be logged with respect to each node $60_1$, $60_2$, $60_3$, $60_4$, $60_D$. Information stored with respect to observed command words may include, by way of example and not by way of limitation:

Command Word
Time of Last Update
History of Performance
Children Pointers
Probability of Quiet Time
Average Quiet Time
Standard Deviation of Quiet Time If time of receiving extant command word 5D1F ($T_m$) less the time that next-previous command word 40D4 was received ($T_{m-1}$) is less than a predetermined quiet period threshold ($QT_{th}$), then a loud period has just occurred. When a loud period occurs information stored with respect to nodes $60_1$, $60_2$, $60_3$, $60_4$, $60_D$ may also be updated, but with an indication that a loud period occurred following command 40D4.

Having such a tree structure permits one to select any node in the tree to determine the probability that a particular sequence will be followed by a quiet period on the observed bus. By way of example and not by way of limitation, examining the probability field of node 62 (relating to command word 5920) in tree 50 may allow one to determine probability of a quiet period following occurrence of command word 5920 followed by command word 3CO2 followed by command word 40D4.

Updating nodes in tree 50 may involve
logging an event in a "History of Performance" field to indicate duration of a quiet period. For a loud period the entered value may be a "0". For a quiet period the entered value may be the amount of time that was recorded as being quiet.
Recalculation of fields (e.g., Probability of Quiet Time, Average Quiet Time, Standard Deviation of Quiet Time) by reviewing entries in "History of Performance" and carrying out necessary calculations.
If a node does not exist when performing an update, one may need to create the node and then update information related with the newly created node.

The "History of Performance" field may be configured so that only the most recent "X" events are logged. Knowledge of one's system employing the method and apparatus of the disclosure may aid determination of an appropriate value for "X". Placing such a limit on the History of Performance field may permit tree 50 to adapt as the overall state of behavior of the first bus controller (e.g., bus controller unit A 20; FIG. 1) changes. That is, by limiting the number of events logged one may ensure that statistical information will not be based upon how the system was acting several minutes or hours ago, but may be based upon current information.

Trimming of tree 50 may be effected. By way of example and not by way of limitation, the field "Time of Last Update" may be used to remove nodes (i.e., trim tree 50) that have not been observed in the last "Y" minutes.

Depending upon the observed system and its behavior, one may be able to create a data structure such as tree 50 only one time so as to embed the information as a constant into programs running the system. Providing such a constant may be useful with systems having consistent behavior over time.

By way of example and not by way of limitation, one may determine that an opportunity may exist for a second bus controller to operate on a bus:

When contents of the Command Word Queue map to a node that has a Probability of Quiet Time greater than X %, has more than Y number of occurrences in its "History of Performance", the node has an Average Quiet Time of more than Z microseconds and a Standard Deviation less than Q, then act as a Second Bus Controller.
When contents of the Command Word Queue map to a node that has a Probability of Quiet Time among the top 0.1% of Probabilities, then act as a Second Bus Controller.
When contents of the Command Word Queue map to a node having a Probability of Quiet Time that is 100% and has more than Y number of occurrences in its "History of Performance", then act as a Second Bus Controller.

Other decision criteria may be derived depending upon details of system performance, operational needs or other factors.

Figure 3:
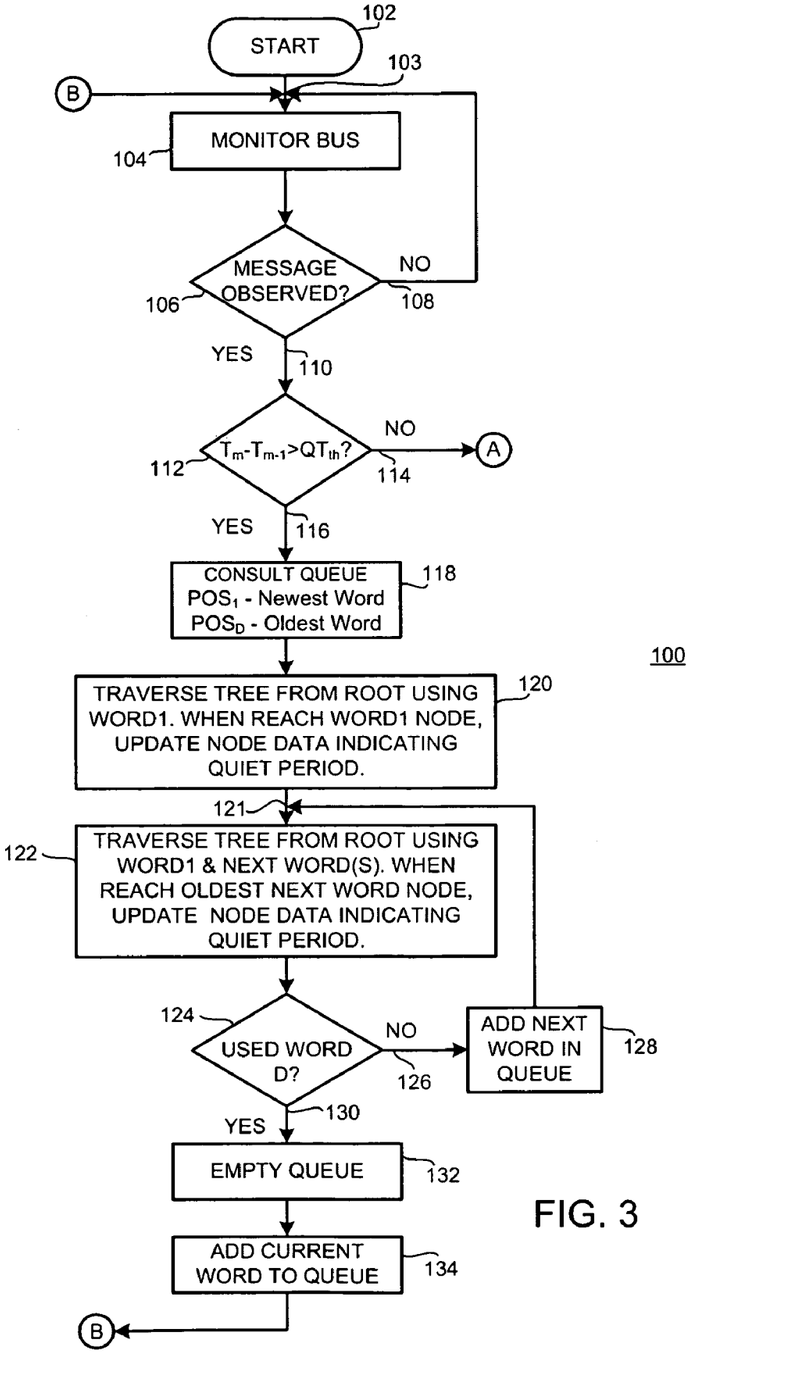
FIG. 3 is a first portion of a flow chart, to be regarded with FIG. 4, illustrating a method for determining quiet periods and loud periods for use by the method and apparatus of the present disclosure.
Figure 4:
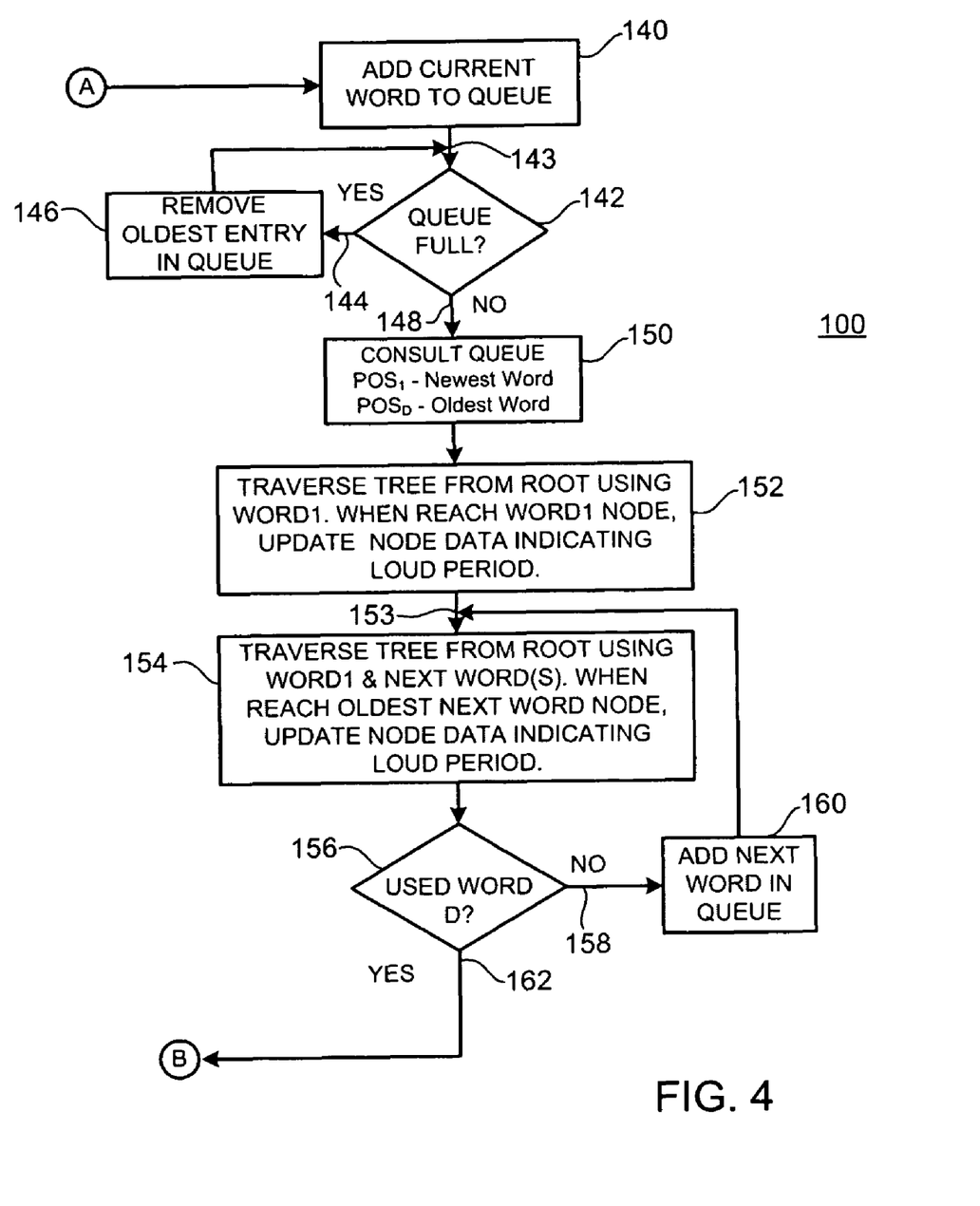
FIG. 4 is a second portion of a flow chart, to be regarded with FIG. 3, illustrating a method for determining quiet periods and loud periods for use by the method and apparatus of the present disclosure.

FIG. 3 is a first portion of a flow chart, to be regarded with FIG. 4, illustrating a method for determining quiet periods and loud periods for use by the method and apparatus of the present disclosure. FIG. 4 is a second portion of a flow chart, to be regarded with FIG. 3, illustrating a method for determining quiet periods and loud periods for use by the method and apparatus of the present disclosure. Regarding FIG. 3 and FIG. 4 together, a method 100 may begin at a START locus 102. Method 100 may continue with monitoring a first bus (e.g., first data bus 22; FIG. 1), as indicated by a block 104.

Method 100 may continue with posing a query whether a message or other traffic has been observed on the monitored data bus, as indicated by a query block 106. If no message or other traffic is observed on the monitored data bus, method 100 may proceed from query block 106 via a NO response line 108 and method 100 may return to a locus 103. Method 100 may proceed from locus 103 as described above with respect to blocks 104, 106. If a message or other traffic is observed on the monitored data bus, method 100 may proceed from query block 106 via a YES response line 110 to pose a query whether time of observing the extant message ($T_m$) less time a next previous message was observed ($T_{m-1}$) is greater than a predetermined quiet period threshold ($QT_{th}$), as indicated by a query bock 112. If time of observing the extant message ($T_m$) less time a next previous message was observed ($T_{m-1}$) is not greater than a predetermined quiet period threshold ($QT_{th}$) (i.e. if Tm−Tm−1<$QT_{th}$), a loud period has occurred and method 100 may proceed from query block 112 via a NO response line 114 to a locus "A" and thence to FIG. 4, to be described later herein. If time of observing the extant message ($T_m$) less time a next previous message was observed ($T_{m-1}$) is greater than a predetermined quiet period threshold ($QT_{th}$) (i.e. if Tm−Tm−1>$QT_{th}$), a quiet period has occurred and method 100 may proceed from query block 112 via a YES response line 116.

Method 100 may continue by consulting a Command Word Queue indicating occurrence of predetermined character groups or words, such as command words, arranging command words that appear on the monitored bus in order of appearance with position 1 ($POS_1$) occupied by the newest or most recently appearing word, and with the last position D ($POS_D$) being occupied by the oldest or least recently appearing word, as indicated by a block 118.

Because a quiet period was noted (block 112) method 100 may continue with traversing the tree from its root position (e.g., node 52; FIG. 2) using a first word (WORD1). WORD1 is the last word observed on the bus prior to the currently observed word. When the evaluation reaches the node associated with WORD1, update data stored for the node associated with WORD1 indicating a quiet period, as indicated by a block 120.

Method 100 may continue with traversing the tree from its root position (e.g., node 52; FIG. 2) using a first word (WORD1) and a second word (WORD2). WORD2 is the second-to-last word observed on the bus prior to the currently observed word. When the evaluation reaches the node associated with WORD2, update data stored for the node associated with WORD2 indicating a quiet period, as indicated by a block 122.

Method 100 may continue with posing a query whether the last word used for traversing the tree was WORDD, as indicated by a query block 124. If the last word used for traversing the tree was not WORDD, method 100 may proceed from query block 124 via a NO response line 126, the next word in the queue may be added, as indicated by a block 128, and method 100 may return to a locus 121 to perform steps relating to blocks 122, 124. If the last word used for traversing the tree was WORDD, then all words WORD1-WORDD have been used for updating nodes and method 100 may proceed from query block 124 via a YES response line 130 to empty the queue, as indicated by a block 132.

Method 100 may continue with adding the currently observed command word to the queue, as indicated by a block 134.

Method 100 may continue with proceeding from block 134 to locus "B" and thence to locus 103 to perform steps associated with blocks 104 through locus "B".

As mentioned earlier herein in connection with block 112, if time of observing the extant message ($T_m$) less time a next previous message was observed ($T_{m-1}$) is not greater than a predetermined quiet period threshold ($QT_{th}$) (i.e. if $Tm-Tm-1 < QT_{th}$), a loud period has occurred and method 100 may proceed from query block 112 via a NO response line 114 to a locus "A" and thence to FIG. 4, specifically to add the currently observed command word to the queue, as indicated by a block 140.

Method 100 may continue with posing a query whether the queue is full, as indicated by a query block 142. If the queue is full method 100 may proceed from query block 142 via a YES response line 144, the oldest entry in the queue may be removed, as indicated by a block 146 and method 100 may return to a locus 143 to again carry out the step represented by query block 142. If the queue is not full method 100 may proceed from query block 142 via a NO response line 148.

Method 100 may continue by consulting a Command Word Queue indicating occurrence of predetermined character groups or words, such as command words, arranging command words that appear on the monitored bus in order of appearance with position 1 ($POS_1$) occupied by the newest or most recently appearing word, and with the last position D ($POS_D$) being occupied by the oldest or least recently appearing word, as indicated by a block 150.

Because a loud period was noted (block 112) method 100 may continue with traversing the tree from its root position (e.g., node 52; FIG. 2) using a first word (WORD1). WORD1 is the last word observed on the bus prior to the currently observed word. When the evaluation reaches the node associated with WORD1, update data stored for the node associated with WORD1 indicating a loud period, as indicated by a block 152.

Method 100 may continue with traversing the tree from its root position (e.g., node 52; FIG. 2) using a first word (WORD1) and a second word (WORD2). WORD2 is the second-to-last word observed on the bus prior to the currently observed word. When the evaluation reaches the node associated with WORD2, update data stored for the node associated with WORD2 indicating a loud period, as indicated by a block 154.

Method 100 may continue with posing a query whether the last word used for traversing the tree was WORDD, as indicated by a query block 156. If the last word used for traversing the tree was not WORDD, method 100 may proceed from query block 156 via a NO response line 158, the next word in the queue may be added, as indicated by a block 160, and method 100 may return to a locus 153 to perform steps relating to blocks 154, 156. If the last word used for traversing the tree was WORDD, then all words WORD1-WORDD have been used for updating nodes and method 100 may proceed from query block 156 via a YES response line 162 to locus "B" and thence to locus 103 (FIG. 3) to perform steps associated with blocks 104 through locus "B".

The present disclosure presents two main components: construction of a tree structure and interpretation of paths in the tree to predict future behavior.

The construction of the tree structure may be effected by taking the command words that are observed on a bus and attaching those command words as nodes onto the tree such that a sequence of command words may be represented as multiple paths on the tree. Tolerances may be set so that, as sequences reappear, older data may be replaced by newer data. In this manner the tree may be adapted to a current state of the system rather than indicating old data for current predictions regarding bus behavior. In some bus applications, additions to the tree, pruning the tree and making determinations on the current state of the bus may need to be made quickly. Commands on some buses such as, by way of example and not by way of limitation, on a MIL-STD-1553 bus may occur as frequently as every 100 microseconds. To accommodate such speedy bus operation, the present disclosure may prune the tree of older data points in order to sacrifice space for speed so as to provide a run-time performance appropriate to keep up with bus operations.

In addition to the general behavior of the method and apparatus, there are certain constants that can be tailored, which may allow a user familiar with a particular bus operation to optimize behavior of the method and apparatus for a particular bus operation.

Figure 5:
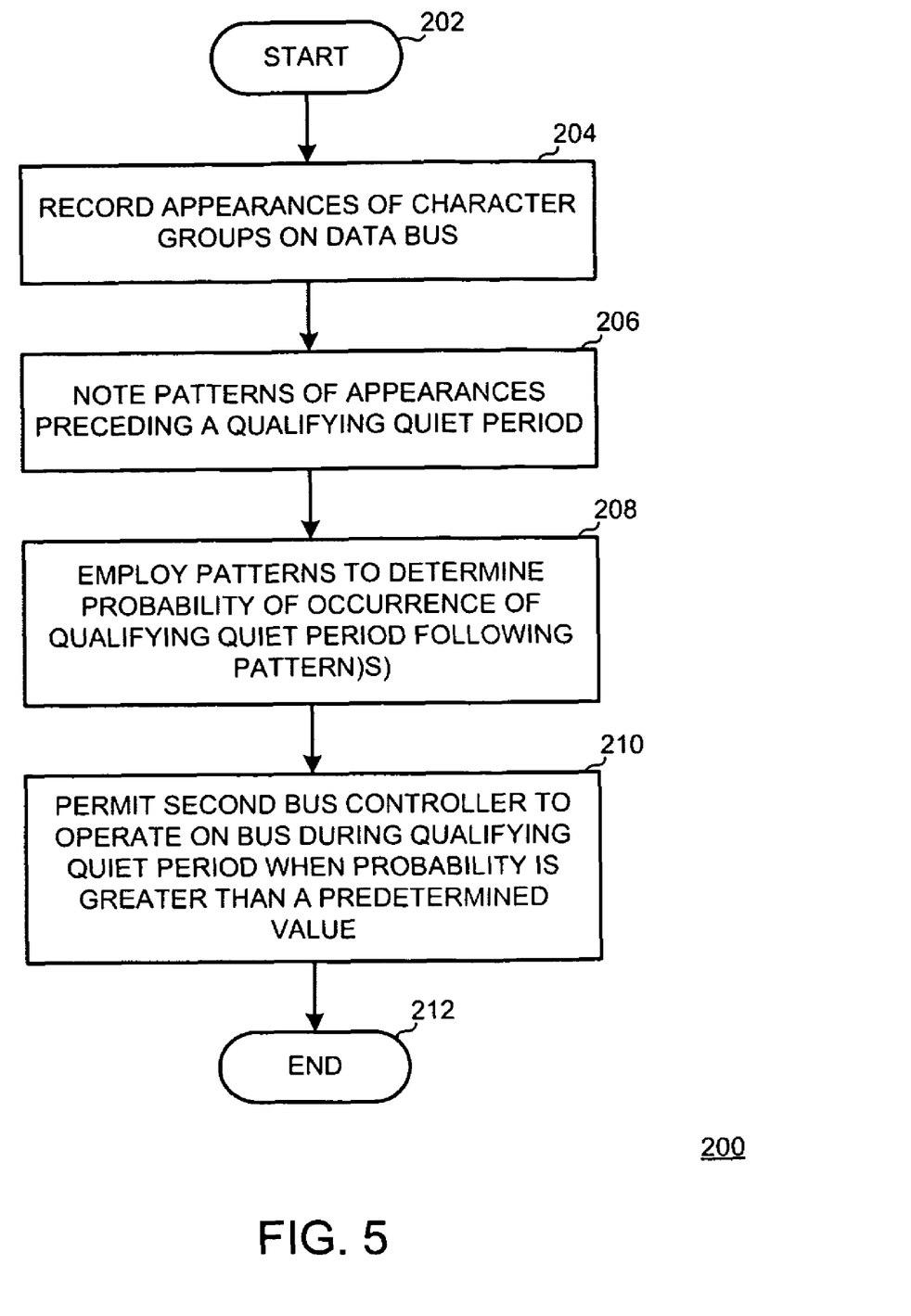
FIG. 5 is a flow chart illustrating the method of the disclosure.

FIG. 5 is a flow chart illustrating the method of the disclosure. In FIG. 5, a method 200 for employing a second bus controller on a data bus having a first bus controller begins at a START locus 202. Method 200 may continue with recording appearances of predetermined character groups on the data bus, as indicated by a block 204.

Method 200 may continue with noting patterns of the appearances preceding a qualifying quiet period on the data bus, as indicated by a block 206. A qualifying quiet period is a time interval having a duration greater than a predetermined duration with no traffic on the data bus.

Method 200 may continue with employing the patterns to determine probability of occurrence of a qualifying quiet period following at least one the pattern, as indicated by a block 208.

Method 200 may continue with permitting the second bus controller to control operation of the data bus during a respective the qualifying quiet period when the probability of occurrence for the respective qualifying quiet period is greater than a predetermined value, as indicated by a block 210. Method 200 may terminate at an END locus 212.

It is to be understood that, while the detailed drawings and specific examples given describe various embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

I claim:

1. A method for employing a second bus controller on a data bus having a first bus controller; the method comprising:
   (a) recording a number of appearances of predetermined character groups on said data bus;
   (b) noting patterns of said appearances preceding a qualifying quiet period on said data bus; said qualifying quiet period being a time interval having a duration greater than a predetermined duration with no traffic on said data bus;
   (c) employing said patterns to determine probability of occurrence of a qualifying quiet period following at least one said pattern; and
   (d) permitting said second bus controller to control operation of said data bus during a respective said qualifying quiet period when said probability of occurrence for said respective qualifying quiet period is greater than a predetermined value; said number of appearances being changeable to permit varying an aspect of data employed to determine said probability of occurrence.

2. The method for employing a second bus controller on a data bus having a first bus controller as recited in claim 1 wherein said number of appearances are stored in a data store, and wherein said number of appearances stored in said data store is limited to a predetermined number; a relatively smaller said number of appearances stored ensuring said probability of occurrence is determined using relatively newer information.

3. The method for employing a second bus controller on a data bus having a first bus controller as recited in claim 1 wherein said recording appearances includes recording additional information relating to selected said appearances.

4. The method for employing a second bus controller on a data bus having a first bus controller as recited in claim 2 wherein said recording appearances includes recording additional information relating to selected said appearances.

5. The method for employing a second bus controller on a data bus having a first bus controller as recited in claim 1 wherein a relatively larger said number of appearances stored tends to permit determining said probability of occurrence with increased accuracy.

6. The method for employing a second bus controller on a data bus having a first bus controller as recited in claim 2 wherein a relatively larger said number of appearances stored tends to permit determining said probability of occurrence with increased accuracy.

7. The method for employing a second bus controller on a data bus having a first bus controller as recited in claim 3 wherein a relatively larger said number of appearances stored tends to permit determining said probability of occurrence with increased accuracy.

8. A method for operating a first bus control unit controlling operation of a first system and a second bus control unit controlling operation of a second system on a data bus; the method comprising:
   (a) operating said first system controlled by said first bus control unit on said data bus;
   (b) recording a number of first system appearances of predetermined first system character groups on said data bus in association with operation of said first system;
   (c) noting patterns of said first system appearances preceding a qualifying quiet period on said data bus; said qualifying quiet period being a time interval having a duration greater than a predetermined duration with no first system traffic or second system traffic on said data bus;
   (d) employing said patterns to determine probability of occurrence of a qualifying quiet period following at least one said pattern; and
   (e) operating said second system controlled by said second bus control unit on said data bus during a respective said qualifying quiet period when said probability of occurrence for said respective qualifying quiet period is greater than a predetermined value; said number of first system appearances being changeable to permit varying an aspect of data employed to determine said probability of occurrence.

9. The method for operating a first bus control unit controlling operation of a first system and a second bus control unit controlling operation of a second system on a data bus as recited in claim 8 wherein said number of first system appearances are stored in a data store, and wherein said number of first system appearances stored in said data store is limited to a predetermined number; a relatively smaller said number of first system appearances stored ensuring said probability of occurrence is determined using relatively newer information.

10. The method for operating a first bus control unit controlling operation of a first system and a second bus control unit controlling operation of a second system on a data bus as recited in claim 8 wherein said recording first system appearances includes recording additional information relating to selected said first system appearances.

11. The method for operating a first bus control unit controlling operation of a first system and a second bus control unit controlling operation of a second system on a data bus as recited in claim 9 wherein said recording first system appearances includes recording additional information relating to selected said first system appearances.

12. The method for operating a first bus control unit controlling operation of a first system and a second bus control unit controlling operation of a second system on a data bus as recited in claim 8 wherein a relatively larger said number of first system stored appearances tends to permit determining said probability of occurrence with increased accuracy.

13. The method for operating a first bus control unit controlling operation of a first system and a second bus control unit controlling operation of a second system on a data bus as recited in claim 9 wherein a relatively larger said number of first system stored appearances tends to permit determining said probability of occurrence with increased accuracy.

14. The method for employing a second bus controller on a data bus having a first bus controller as recited in claim 10 wherein a relatively larger said number of first system stored appearances tends to permit determining said probability of occurrence with increased accuracy.

15. An apparatus for employing a second bus controller on a data bus having a first bus controller; the apparatus comprising:
(a) a recording unit for recording a number of appearances of predetermined character groups on said data bus;
(b) a noting unit for noting patterns of said appearances preceding a qualifying quiet period on said data bus; said qualifying quiet period being a time interval having a duration greater than a predetermined duration with no traffic on said data bus;
(c) a probability determining unit for employing said patterns to determine probability of occurrence of a qualifying quiet period following at least one said pattern; and
(d) a directing unit for permitting said second bus controller to control operation of said data bus during a respective said qualifying quiet period when said probability of occurrence for said respective qualifying quiet period is greater than a predetermined value; said number of appearances being changeable to permit varying an aspect of data employed to determine said probability of occurrence.

16. The apparatus for employing a second bus controller on a data bus having a first bus controller as recited in claim 15 wherein said number of appearances are stored in a data store, and wherein said number of appearances stored in said data store is limited to a predetermined number; a relatively smaller said number of appearances stored ensuring said probability of occurrence is determined using relatively newer information.

17. The apparatus for employing a second bus controller on a data bus having a first bus controller as recited in claim 15 wherein said recording appearances includes recording additional information relating to selected said appearances.

18. The apparatus for employing a second bus controller on a data bus having a first bus controller as recited in claim 16 wherein said recording appearances includes recording additional information relating to selected said appearances.

19. The apparatus for employing a second bus controller on a data bus having a first bus controller as recited in claim 15 wherein a relatively larger said number of appearances stored tends to permit determining said probability of occurrence with increased accuracy.

20. The apparatus for employing a second bus controller on a data bus having a first bus controller as recited in claim 16 wherein a relatively larger said number of appearances stored tends to permit determining said probability of occurrence with increased accuracy.

* * * * *